United States Patent
Tongue

(10) Patent No.: US 7,384,454 B2
(45) Date of Patent: Jun. 10, 2008

(54) COMBINED WATER-FROM-AIR AND WATER-FROM-EXHAUST SYSTEM

(75) Inventor: Stephen Tongue, Hampden, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 432 days.

(21) Appl. No.: 11/266,576

(22) Filed: Nov. 3, 2005

(65) Prior Publication Data

US 2007/0095209 A1    May 3, 2007

(51) Int. Cl.
*B01D 53/04* (2006.01)
*B01D 53/26* (2006.01)

(52) U.S. Cl. ............... 95/114; 95/126; 96/121; 96/122; 96/126; 96/130; 96/146

(58) Field of Classification Search ............ 95/90, 95/114, 115, 117, 121, 123, 126, 148, 288; 96/108, 115, 121, 122, 126, 127, 130, 146
See application file for complete search history.

(56) References Cited

U.S. PATENT DOCUMENTS

| | | | | |
|---|---|---|---|---|
| 4,285,702 | A  * | 8/1981 | Michel et al. | 95/124 |
| 5,846,296 | A  * | 12/1998 | Krumsvik | 95/115 |
| 6,336,957 | B1 * | 1/2002 | Tsymerman | 95/115 |
| 6,511,525 | B2 * | 1/2003 | Spletzer et al. | 95/41 |
| 6,652,628 | B1 * | 11/2003 | Hess | 95/113 |
| 6,804,964 | B2 | 10/2004 | Bellows et al. | |
| 6,863,711 | B2 | 3/2005 | Tongue et al. | |
| 2002/0148221 | A1 * | 10/2002 | Jagtoyen et al. | 60/309 |
| 2007/0028769 | A1 * | 2/2007 | Eplee et al. | 95/113 |

* cited by examiner

*Primary Examiner*—Frank M Lawrence
(74) *Attorney, Agent, or Firm*—Carlson, Gaskey & Olds

(57) ABSTRACT

A water production unit is provided having two modes of operation for extracting water from exhaust and air.

17 Claims, 3 Drawing Sheets

COMBINED WATER-FROM-AIR AND WATER-FROM-EXHAUST SYSTEM

BACKGROUND OF THE INVENTION

This invention relates to a water production unit that uses two modes of operation to efficiently extract water from air and exhaust.

One product of combustion from an engine is water. Water is typically expelled from the engine as a waste product, however, the prior art has recognized the need to recover this water. There are many environments in which an engine is used where water is desired but not readily available. For example, during military campaigns water is typically brought to remote or arid regions where water is not readily available. Water must be brought along a supply line to troops, where military vehicles are often present, which is dangerous and costly.

A water recovery system has been proposed to extract water from a turbine's exhaust. The proposed system is suggested for a stationary turbine engine used in a power generation plant to reduce emissions by injecting the recovered water into the combustor. However, any system employed in a military or similar vehicle must be highly efficient to justify the system. Further, it is desirable to have the ability to collect water when the engine is not running. Therefore, what is needed is an improved water production unit for an engine.

SUMMARY OF THE INVENTION

The present invention provides a water production unit including an exhaust source providing exhaust, such as from an engine of a military vehicle. A heat exchanger is in fluid communication with the exhaust source. A bed used to adsorb and desorb moisture is arranged proximate to the heat exchanger. The bed is adapted to be in fluid communication with air and to receive heat from the exhaust. A storage container is in fluid communication with the heat exchanger and the bed for receiving water from the heat exchanger and bed. A controller selectively controls flow of the exhaust and the air through the heat exchanger and the bed, respectively, for extracting water from the exhaust and the air.

Airflow and exhaust flow through the bed and the heat exchanger are regulated using valves that are commanded by the controller. The water production unit operates in two modes. The first mode has a water adsorbtion phase in which the bed is loaded with moisture. The engine need not run during this phase. A water desorbtion phase extracts the water from the bed in the first mode using heat from the exhaust. The second mode extracts water from the exhaust.

Accordingly, the present invention provides two modes for efficiently extracting water from the exhaust and air depending upon the surrounding environment and operating conditions of the military vehicle.

These and other features of the present invention can be best understood from the following specification and drawings, the following of which is a brief description.

DETAILED DESCRIPTION OF THE PREFERRED EMBODIMENT

Figure 1:
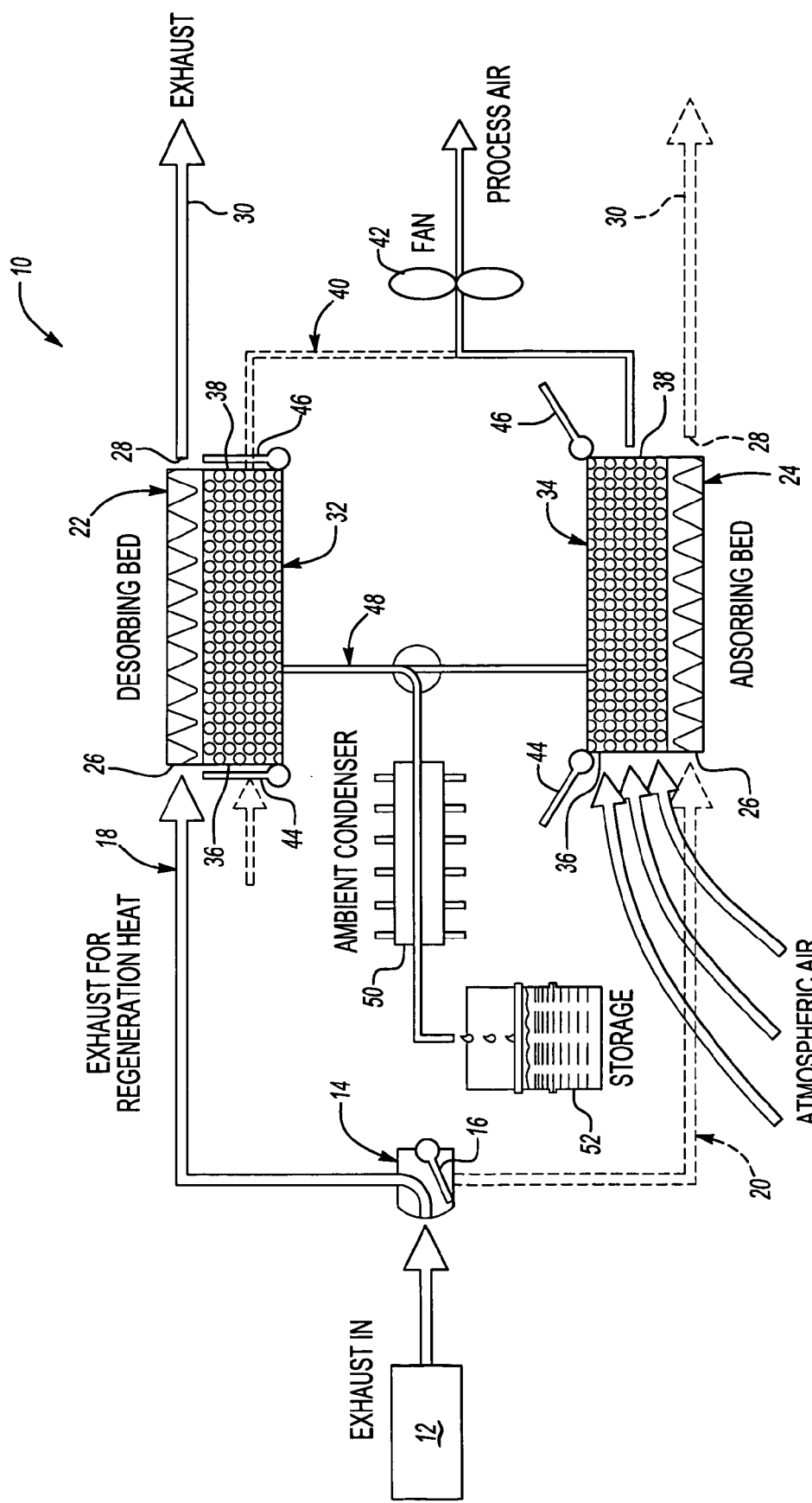
FIG. 1 is a highly schematic view of a first mode of operation of a water production unit in which water is extracted from air.
Figure 2:
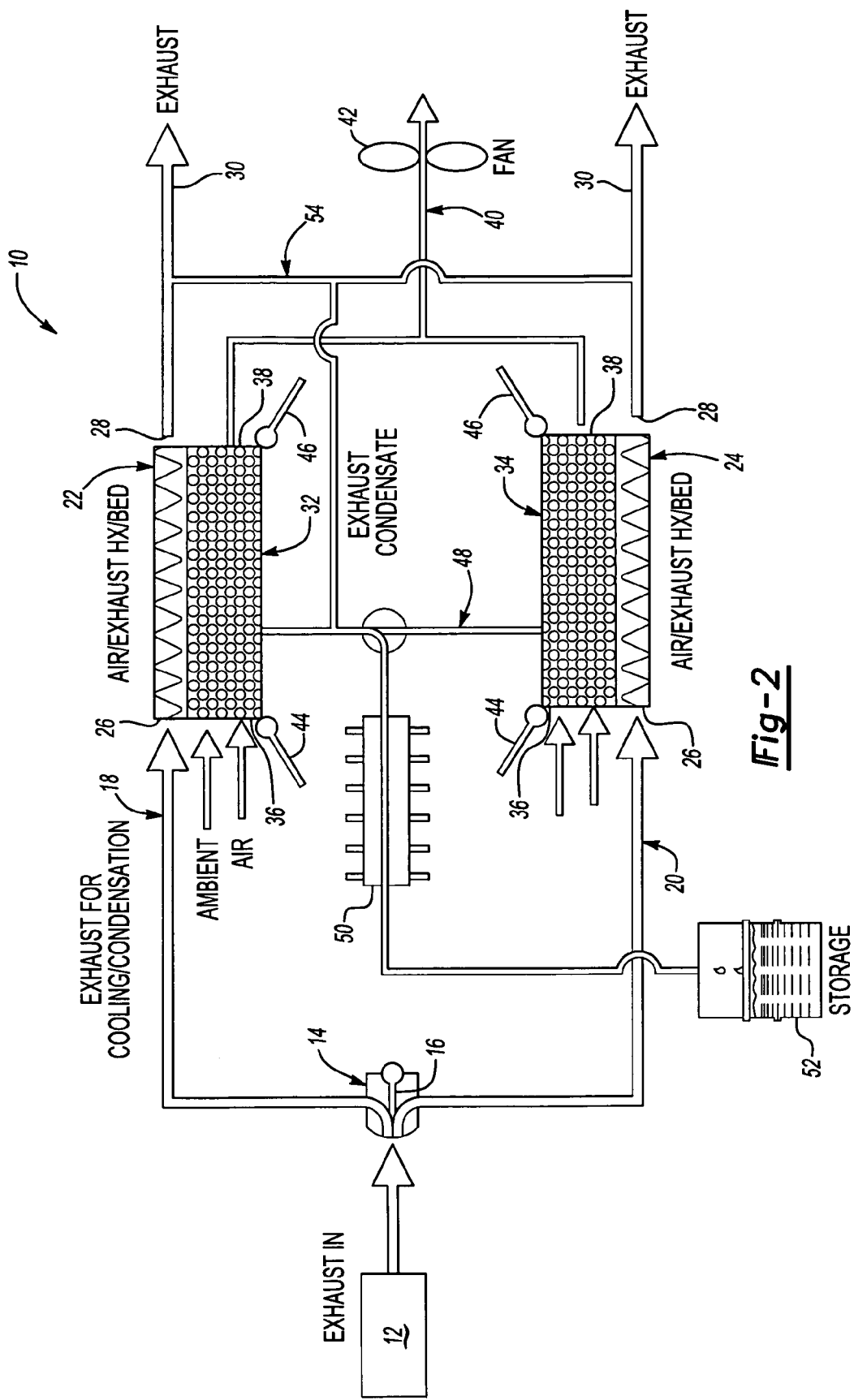
FIG. 2 is a highly schematic view of a second mode of operation of the water production unit in which water is extracted from exhaust.

A water production unit 10 is shown in FIGS. 1 and 2. FIG. 1 depicts a first mode of operation for this unit 10 in which water is extracted from air using a sorbent system. The air may be taken from the environment surrounding the unit 10. FIG. 2 depicts a second mode of operation for the unit 10 in which water is extracted from exhaust of an exhaust source 12, such as an engine from a military vehicle.

Referring to FIG. 1, the exhaust source 12 provides exhaust to a junction 14 having an exhaust flow valve 16. The junction 14 separates the exhaust flow into first and second exhaust pipes 18 and 20. The exhaust is split into multiple flows for more efficient operation of the sorbent system, which will be appreciated from the discussion below.

The first and second exhaust pipes 18 and 20 provide exhaust to first and second heat exchangers 22 and 24 respectively, through exhaust inlets 26. It should be understood that the junction 14 need not be used and that the first and second exhaust pipes 18 and 20 may be provided by opposing engine exhaust manifolds. For such an arrangement, an exhaust flow valve 16 may be associated with each exhaust pipe 18 and 20.

Exhaust exits the first and second heat exchangers 22 and 24 through outlets 28 where the exhaust eventually exits through a tailpipe 30. In the example shown, two tailpipes 30 are shown although a common tailpipe may be used.

First and second sorbent beds 32 and 34 are arranged proximate to the first and second heat exchangers 22 and 24, respectively, so that the beds 32 and 34 may receive heat from the heat exchangers 22 and 24. Conversely, the heat exchangers 22 and 24 receive cooling flow from the beds 32 and 34.

The beds 32 and 34 contain a suitable sorbent media for adsorbing moisture. The sorbent media desorbs or extracts the water when exposed to heat, thus recharging the bed. As a result, the sorbent media typically more efficiently adsorbs moisture when the surrounding heat is minimized.

The first and second sorbent beds 32 and 34 include air inlets and outlets 36 and 38. The outlets 34 communicate with a ducting 40, which may have a fan 42 arranged in the ducting 40 to pull air through the beds 32 and 34 when desired. Air may also be forced through the ducting 40 during movement of the vehicle.

In the example shown, the beds 32 and 34 each include first and second airflow valves 44 and 46 that regulate airflow through the beds 32 and 34. The water collection tubes 48 from the beds 32 and 34 fluidly communicate with a condenser 50 that feeds to a storage container 52. As shown in FIG. 2, an exhaust water collection tubes 54 are in fluid communication with the condenser 50, and are fluidly connected to and downstream of the first and second heat exchangers 22 and 24.

Figure 3:
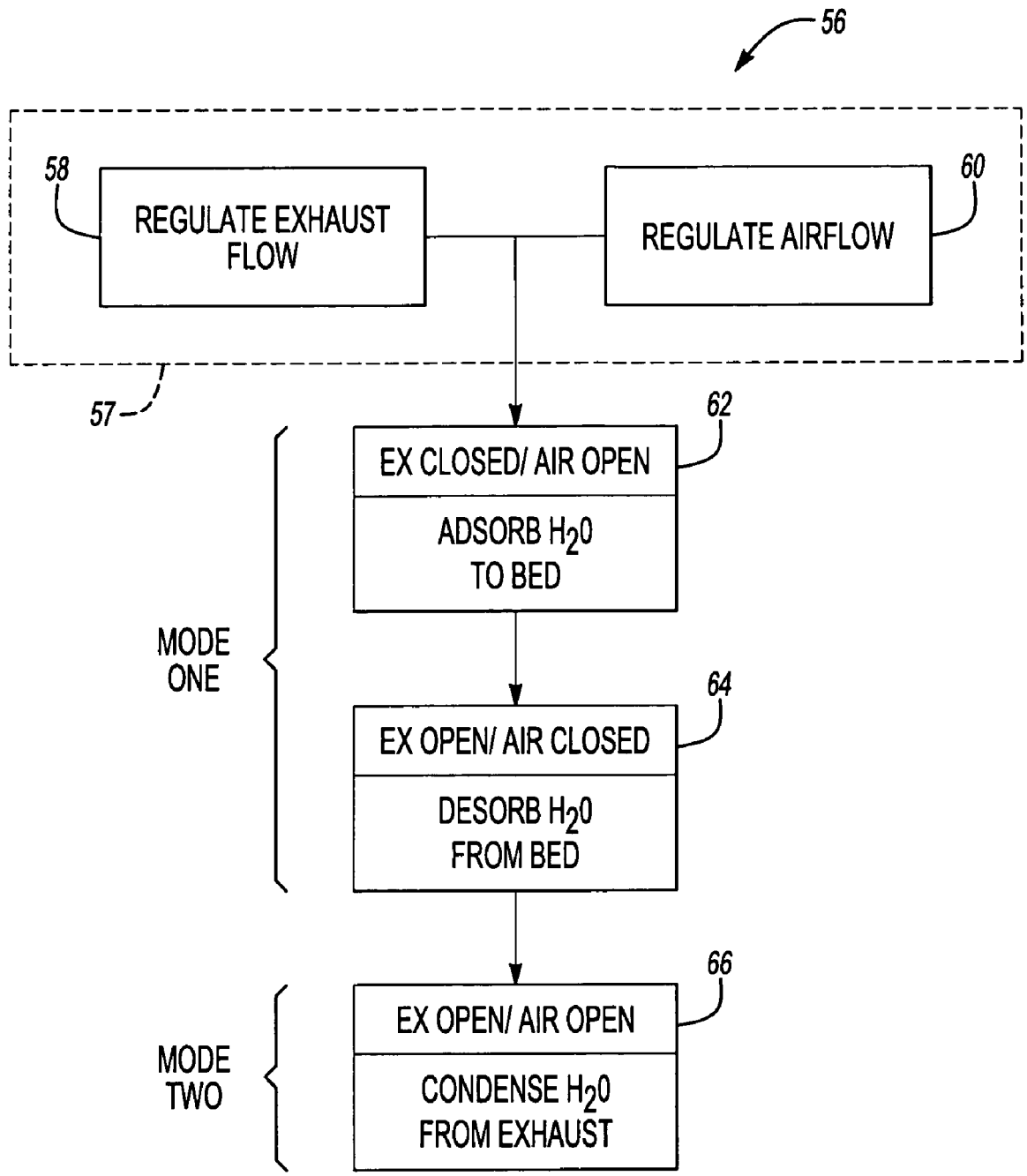
FIG. 3 is a block diagram of a method of using the inventive water production unit.

A method of operation is shown schematically by a flow chart in FIG. 3. The method 56 includes regulating exhaust flow, as indicated by block 58, and regulating airflow, as indicated by block 60, selectively using a controller 57. For example, the controller 57 commands the exhaust flow valve 16 and airflow valves 44 and 46 using actuators (not shown) to move the valves 16, 44 and 46 between open and closed positions. The controller 57 may also communicate with the fan 42 to drive the fan 42 when desired.

In one contemplated application, the first mode shown in FIG. 1 may be employed when the vehicle engine is not running or during other applications in which it is not desirable to extract water from the exhaust or cool the exhaust. The second mode of operation, which is shown FIG. 2, may be used when the engine is running. The controller 57 may receive inputs from various sensors (not shown) to determine the most desired mode of operation. Parameters considered by the controller 57 may include humidity of the air and temperatures of the engine and environment. The mode of operation of the water production unit may also be manually selected by the vehicle operator.

Referring to FIGS. 1 and 3, the exhaust flow valve 16 is moved to the closed position to minimize exhaust flow to at least one of the heat exchangers 22 and 24. The airflow valves 44 and 46 are open to that same heat exchanger to enable airflow to pass through the bed associated with that heat exchanger, such as by drawing air through that bed using the fan 42. With the heat to the bed minimized, the sorbent material of the bed is more effectively loaded with moisture.

Water can be extracted from the moisture laden bed by closing the airflow valves 44 and 46 and opening the exhaust flow valve 16 to expose the bed to heat. Arranging airflow valves 44 and 46 on either side of the bed better contains the heat within the bed. Water is desorbed or extracted from the bed and flows through the water collection tubes 48 and through condenser 50 into the storage container 52. By using at least two beds, one bed can adsorb water while another bed extracts water.

Referring to FIGS. 2 and 3, water is extracted from the exhaust when the exhaust flow valve 16 is in the open position. The valves 44 and 46 are moved to the open position to permit air to pass through the heat exchanger from associated bed to cool the exhaust, which exits through the exhaust outlet 28. A portion of the cooled exhaust flows through the water collection tubes 54 and through condenser 50 where condensed vapor flows into the storage container 52.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A water production unit comprising:
   an exhaust source for providing exhaust;
   a heat exchanger in fluid communication with said exhaust source;
   a bed proximate to the heat exchanger, said bed adapted to be in fluid communication with air and to receive heat from the exhaust;
   a storage container in fluid communication with said heat exchanger and said bed, said storage container adapted to receive water from said heat exchanger and said bed; and
   a controller selectively controlling flow of the exhaust and the air through said heat exchanger and said bed, respectively, for extracting water from the exhaust and the air.

2. The water production unit according to claim 1, wherein an airflow valve is movable between open and closed positions in response to an airflow command from said controller, said airflow valve regulating flow of the air through said bed.

3. The water production unit according to claim 2, wherein said storage container is arranged downstream from said bed, and a condenser arranged between said storage container and said bed.

4. The water production unit according to claim 2, wherein said controller commands a first mode having an adsorption phase in which said airflow valve is open with air flowing through said bed and exhaust flow through said heat exchanger minimized, said adsorption phase loading said bed with moisture.

5. The water production unit according to claim 4, wherein said controller commands the first mode having a desorption phase in which said airflow valve is closed with exhaust flowing through said heat exchanger heating said bed, said desorption phase extracting water from said bed.

6. The water production unit according to claim 5, wherein an exhaust flow valve is movable between open and closed positions in response to an exhaust command from said controller, said exhaust flow valve in said closed position during said adsorption phase and in said open position during said desorption phase.

7. The water production unit according to claim 1, wherein an exhaust flow valve is movable between open and closed positions in response to an exhaust command from said controller, said exhaust flow valve regulating flow of the exhaust through said heat exchanger.

8. The water production unit according to claim 7, wherein said storage container is arranged downstream from said heat exchanger, and a condenser arranged between said storage container and said heat exchanger.

9. The water production unit according to claim 7, wherein said controller commands a second mode in which said exhaust flow valve is open with air flowing through said heat exchanger cooling the exhaust to extract water from the exhaust.

10. The water production unit according to claim 9, wherein an airflow valve is movable between open and closed positions in response to an airflow command from said controller, said airflow valve in said open position in said second mode.

11. A method of producing water comprising the steps of:
   a) regulating airflow through a heat exchanger;
   b) regulating airflow through an adsorption/desorption bed;
   c) regulating exhaust flow through the heat exchanger; and
   d) selectively extracting water from the exhaust flow and airflow.

12. The method according to claim 11, wherein step a) includes moving an airflow valve.

13. The method according to claim 11, wherein step b) includes moving an airflow valve.

14. The method according to claim 11, wherein step c) includes moving an exhaust flow valve.

15. The method according to claim 11, wherein step d) includes passing at least one of the airflow and exhaust flow through a condenser.

16. The method according to claim 15, wherein step d) includes collecting the water in a storage container.

17. The method according to claim 11, wherein the heat exchanger and the bed are arranged proximate to one another, airflow through the bed cooling the heat exchanger, and exhaust flow through the heat exchanger heating the bed.

* * * * *